(12) United States Patent
Oh et al.

(10) Patent No.: US 8,905,897 B2
(45) Date of Patent: Dec. 9, 2014

(54) CREEP TORQUE CONTROL METHOD OF VEHICLE

(75) Inventors: Jonghan Oh, Yongin Dyeonggi-Do (KR); Jeongeun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 403 days.

(21) Appl. No.: 13/312,917

(22) Filed: Dec. 6, 2011

(65) Prior Publication Data

US 2013/0017928 A1    Jan. 17, 2013

(30) Foreign Application Priority Data

Jul. 14, 2011   (KR) .................. 10-2011-0069912

(51) Int. Cl.
| | | |
|---|---|---|
| *B60W 10/18* | (2012.01) | |
| *B60W 10/08* | (2006.01) | |
| *F16H 61/20* | (2006.01) | |
| *B60W 30/18* | (2012.01) | |
| *F16H 59/54* | (2006.01) | |

(52) U.S. Cl.
CPC ............ *B60W 10/08* (2013.01); *F16H 61/20* (2013.01); *B60W 30/18063* (2013.01); *B60W 10/182* (2013.01); *F16H 59/54* (2013.01); *F16H 2061/202* (2013.01); *B60W 2510/083* (2013.01); *B60W 2520/10* (2013.01); *B60W 2540/12* (2013.01)
USPC ........................................ 477/203

(58) Field of Classification Search
None
See application file for complete search history.

(56) References Cited

U.S. PATENT DOCUMENTS 6,510,374 B1 *   1/2003   Saotome et al. ............... 701/80
8,439,795 B2 *   5/2013   Miyamoto et al. ............ 477/27

FOREIGN PATENT DOCUMENTS

| JP | 2000-115906 A | 4/2000 |
|---|---|---|
| JP | 2003146114 A | 5/2003 |
| JP | 2007-159171 A | 6/2007 |
| JP | 2009-273325 A | 11/2009 |
| JP | 2011036120 A | 2/2011 |
| KR | 1020110035694 A | 4/2011 |

* cited by examiner

*Primary Examiner* — Robert A Siconolfi
*Assistant Examiner* — Huan Le
(74) *Attorney, Agent, or Firm* — Edwards Wildman Palmer LLP; Peter F. Corless

(57) ABSTRACT

Disclosed is a method and power delivery system for controlling creep torque in a hybrid or electric vehicle. More specifically, a brake signal is detected and a creep torque output is controlled based on the brake signal. The creep torque is outputted for a predetermined time from a point when a brake on signal is first generated. Accordingly, a creep torque is generated for a predetermined time when a brake is being operated and backlash is eliminated between gears so as to prevent a backlash shock from the gears when the brake is released. Additionally, the vehicle may be propelled forward or backward by the creep torque in the creep torque control method of a vehicle according to an exemplary embodiment of the present invention.

18 Claims, 5 Drawing Sheets

CREEP TORQUE CONTROL METHOD OF VEHICLE

CROSS-REFERENCE TO RELATED APPLICATION

This application claims priority to and the benefit of Korean Patent Application No. 10-2011-0069912 filed in the Korean Intellectual Property Office on Jul. 14, 2011, the entire contents of which are incorporated herein by reference.

BACKGROUND OF THE INVENTION (a) Field of the Invention

The present invention relates to a creep torque control system and method for a vehicle that controls creep torque that is generated by an engine or a motor via a transmission due to vehicle speed, a gear shift step, and a braking signal to prevent shock generated due to backlash.

(b) Description of the Related Art

Generally, a creep torque is generated by a motor in an electric or hybrid vehicle according to predetermined data and a gear shift step of a transmission and vehicle speed. In an effort to prevent creep torque, certain systems have been activated when a brake is operated to reduce drive energy from a motor or an engine.

Backlash is gear movement relative to a stationary gear as a result of a gap between gear teeth when two gears are engaged with each other, and a backlash gap is formed so that the gears can smoothly rotate and lubricant can be held in the gap appropriately. If the backlash gap is reduced, energy can be lost due at least to reduced lubrication, and if the backlash gap is increased, the gears can be damaged thereby most likely generating noise. Further, the backlash gap generates a backlash shock when the vehicle stops or starts and can sometimes cause discomfort to a driver.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a creep torque control method of a vehicle having advantages of reducing a backlash shock generated from a drive system of a vehicle by using a brake signal and a creep torque, accordingly.

A creep torque control system and method of a vehicle according to an exemplary embodiment of the present invention may include detecting a brake signal, and controlling a creep torque output based on the brake signal, wherein the creep torque is outputted for a predetermined time from a start point when a brake on signal is generated. Additionally, the start point of the brake on signal may be delayed in some embodiments of the present invention. In particular, a torque output control step outputs a creep torque while the start point of the brake on signal is delayed.

The creep torque output may be further controlled by generating the creep torque depending upon the on/off status of the brake signal. For example, the creep torque may be generated when the brake single is off and be released when the brake signal is on.

The creep torque control method of a vehicle may further include detecting a gear shift step and detecting the speed of the vehicle. In this instance, the outputted creep torque is calculated based on the vehicle speed and the gear shift step. For example, creep torque may be configured to be generated when the vehicle speed is 0. Furthermore, a rate limit process or a filtering process may be performed such that the creep torque is gradually and continuously increased.

The creep torque control method of a vehicle may further include a motor/generator that is configured to generate a driving torque or use a regeneration torque to generate electricity. More specifically, the motor/generator may be configured to generate the creep torque. The creep torque in the exemplary embodiment of the present invention may be outputted by a transmission when the brake signal is not detected after the brake signal has previously been detected. In some embodiments of the present invention, the creep torque may be generated in a running state such as a drive (D) state or a reverse (R) state, but not a neutral (N) state.

As described above, a creep torque is generated for a predetermined time when a brake is being operated and the backlash is eliminated between gears so as to prevent backlash shock of the gears when the brake is released and the vehicle is moved by the creep torque in the creep torque control method of a vehicle according to an exemplary embodiment of the present invention.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other vehicle with multiple power sources (e.g. an engine and a motor). As referred to herein, a hybrid vehicle is a vehicle that has two or more sources of power, for example both gasoline-powered and electric-powered vehicles.

Figure 1:
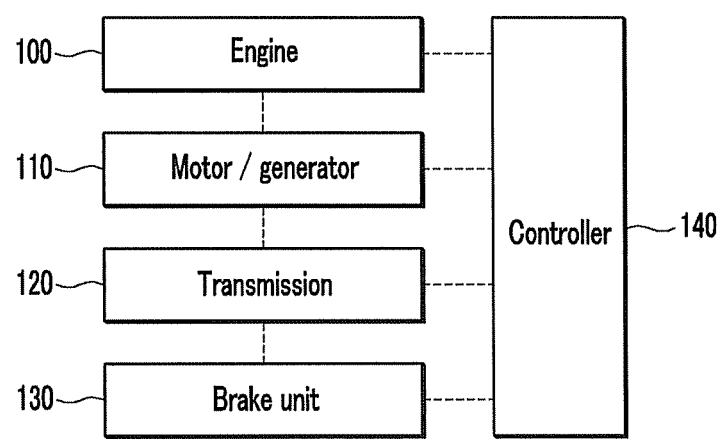
FIG. 1 is a schematic diagram of a creep torque control system of a vehicle according to an exemplary embodiment of the present invention.

FIG. 1 is a schematic diagram of a creep torque control system of a vehicle according to an exemplary embodiment of the present invention. Referring to FIG. 1, a creep torque control system and method of a vehicle includes an engine 100, a motor/generator 110, a transmission 120, a brake unit 130, and a control portion 140.

The engine 100 or the motor/generator 110 can be selectively applied in an exemplary embodiment of the present invention. Accordingly, an engine 100 and a motor/generator 110 are both applied to a hybrid electric vehicle (HEV), and the motor/generator 110 only is applied to an electric vehicle (EV). The motor/generator 110 assists with driving torque of the engine 100 or functions as a main drive source without the power from the engine 100. Further, the motor/generator 110 can also function as a motor for generating driving torque and can simultaneously function as a generator for generating electricity through regenerative braking. Thus, as used herein, the term power source is used to refer to the engine, the motor or both.

The transmission 120 varies the torque output from the engine 100 or the motor/generator 110 according to a predetermined ratio to output a predetermined torque. The transmission 120 may selectively include a planetary gear set, a torque converter, and a continuous variable transmission (CVT).

The control portion (e.g., a controller or CPU) 140 detects when brakes are applied by a brake unit 130, detects a gear shift step from the transmission 120, and controls the motor/generator 110 and the engine 100 to generate creep torque through the transmission 120 when required. The control portion 140 releases the creep torque while the brake unit 130 is being operated so that the creep torque is not generated in an exemplary embodiment of the present invention at the same time the brakes are being applied. However, the creep torque is generated for a predetermined time from the point that a "brake on" signal is generated so as to prevent shock caused by the backlash between the gears of the drive system when the brake is released after being operated.

Figure 2:
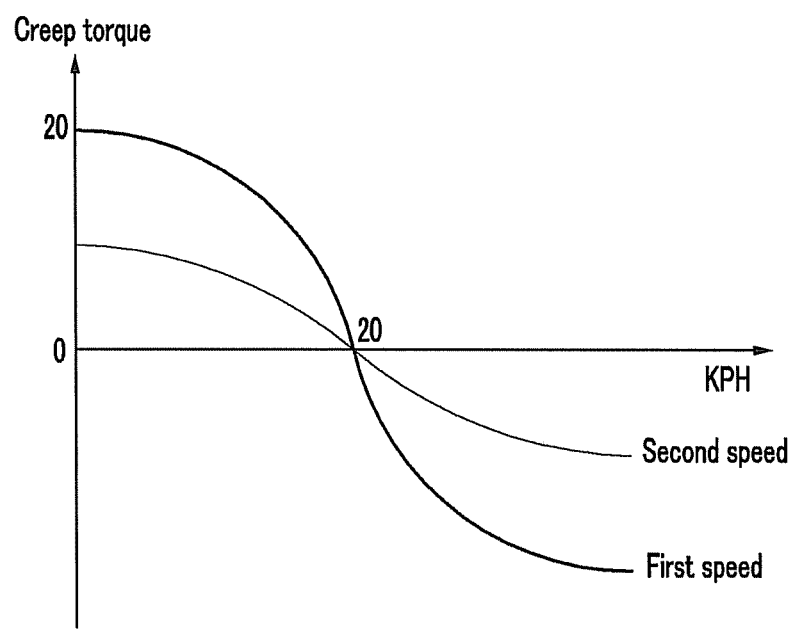
FIG. 2 is a graph showing the magnitude of creep torque according to a gear shifting step and the speed of the vehicle in a creep torque control system of a vehicle according to an exemplary embodiment of the present invention.

FIG. 2 is a graph showing the magnitude of creep torque according to a gear shifting step and a vehicle speed in a creep torque control system of a vehicle according to an exemplary embodiment of the present invention. Referring to FIG. 2, the horizontal axis denotes vehicle speed (KPH) and the vertical axis denotes the magnitude of the creep torque. The magnitude of the creep torque has a positive value when the vehicle speed is less than 20 KPH, and the magnitude thereof has a negative value when the vehicle speed is greater than 20 KPH. That is, when the vehicle speed is less than 20 KPH, a positive torque is generated to increase the vehicle speed, and when the vehicle speed is greater than 20 KPH, a negative torque is generated to reduce the vehicle speed. Further, the creep torque is varied depending on the gear shift step of the transmission, wherein an absolute value of the creep torque is larger in a first speed than a second speed.

As shown, the creep torque is set in accordance with the gear shift step and the vehicle speed, and the creep torque is processed by a rate limit or by a filtering process so as to gradually increase the creep torque. The rate limit process increases the creep torque according to stages, and the filtering process increases the creep torque smoothly and gradually.

Figure 3:
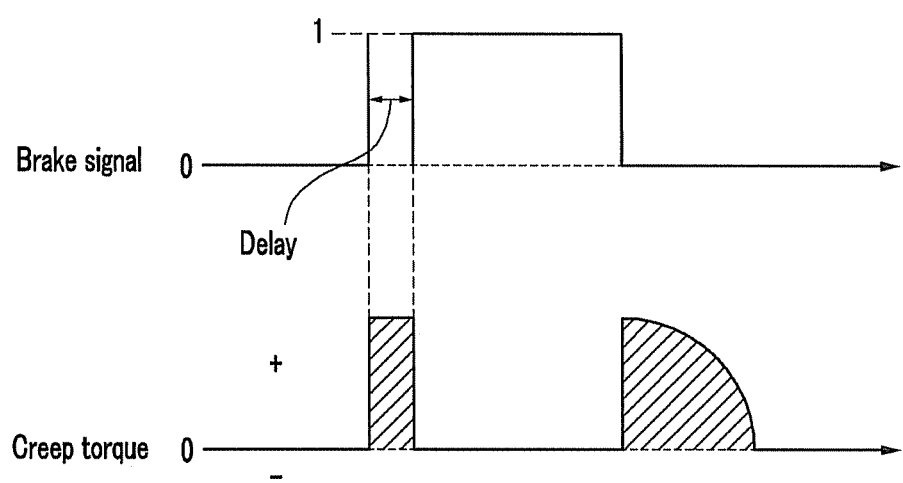
FIG. 3 is graph showing a relationship between a brake signal and a creep torque in a creep torque control method of a vehicle according to an exemplary embodiment of the present invention.

FIG. 3 is graph showing a relationship between a brake signal and creep torque in a creep torque control method of a vehicle according to an exemplary embodiment of the present invention. Referring to FIG. 3, if a brake signal is 0 (OFF), the brake is not currently being operated, and if a brake signal is 1(ON), the brake is being operated by the driver.

As shown, the creep torque is generated for a predetermined time from the point that the brake on signal is generated, and the creep torque is not generated for the remaining time while the brake signal is generated. Accordingly, the backlash gap between the gears is eliminated by the creep torque and therefore afterwards the shock by the backlash is not generated when the creep torque is generated by the brake single 0. Further, while the brake signal is being generated, the creep torque is generated only initially, and therefore the loss of drive energy is minimized. The creep torque can be generated by delaying the signal from the point that the brake signal starts in an exemplary embodiment of the present invention, which is call a "rising delay."

As described above, the creep torque is controlled to be generated for a predetermined time by performing the rising delay after the brake signal, and further the creep torque may be controlled to be generated for a predetermined time from the point that the brake signal is input. From that point, the creep torque is controlled to not be generated without delaying the brake signal. Here, if the brake signal is not generated, the creep torque is not normally generated as well.

Figure 4:
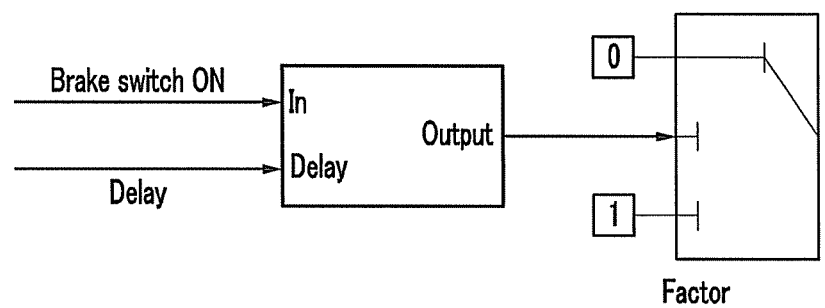
FIG. 4 is a control chart showing a creep torque control method of a vehicle according to an exemplary embodiment of the present invention.

FIG. 4 is a control chart showing a creep torque control method of a vehicle according to an exemplary embodiment of the present invention. Referring to FIG. 4, a brake switch signal is input and a signal for delaying the brake switch signal is simultaneously input. Here, the method for delaying the brake signal is a rising delay method, wherein the brake signal is delayed for a predetermined time from the point that the brake signal is input.

As shown, the signal of 0 or 1 is output according to the input signal, and if 0 is output, the creep torque is not generated, while if 1 is output, the creep torque is generated. The creep torque has a predetermined value to be output depending on the vehicle speed, and as described above, the creep torque is controlled to be gradually increased by the rate limit process and the filter process.

Figure 5:
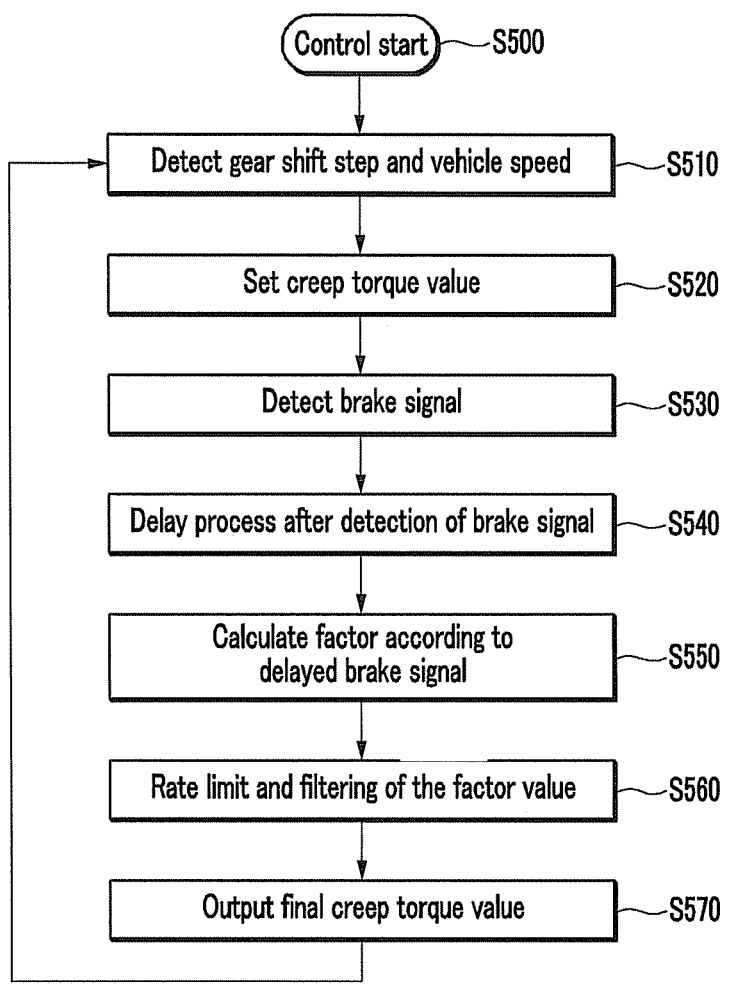
FIG. 5 is a flowchart showing a creep torque control method of a vehicle according to an exemplary embodiment of the present invention.

FIG. 5 is a flowchart showing a creep torque control method of a vehicle according to an exemplary embodiment of the present invention. Referring to FIG. 5, a controller initiates in S500 and the gear shift step and the vehicle speed are detected in S510, accordingly. Detailed descriptions of the method for detecting the vehicle speed and the gear shift step will be omitted as they are well-known to those skilled in the art.

The creep torque value is selected or calculated according to a gear shift step and a vehicle speed that are sensed in S520, and a brake signal is sensed in at S530. Here, if the brake signal is detected, a drive wheel is braked accordingly. The brake on signal is processed to be rising-delayed for a predetermined time so as to increase the creep torque in S540.

A factor value (0 or 1) is output according to the delayed brake on/off signal of S530 and the factor value is processed through the rate limit process or the filter process in S560. The rate limit process signifies sequentially increasing/decreasing the creep torque by a predetermined amount and the filtering process signifies smoothly and continuously increasing/decreasing the creep torque. The finally calculated creep torque is applied in S570 to control the engine, the motor/generator, and the transmission so that the vehicle is operated by the creep torque accordingly.

The creep torque may be generated in a drive (D) condition or a reverse (R) condition of the transmission, and particularly, the creep torque prevents the shock generated by the backlash in a condition in which the vehicle stops in the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: engine
110: motor/generator
120: transmission
130: brake unit
140: control portion

What is claimed is:

1. A creep torque control method of a vehicle, comprising:
   detecting, by a controller, a brake signal;
   controlling, by the controller, a creep torque output by the vehicle based on the brake signal, wherein the creep torque is outputted for a predetermined time from a point in time when a brake on signal was generated; and
   delaying the point in time of the brake on signal, wherein the creep torque is outputted while the point in time of the brake on signal is delayed.

2. The creep torque control method of claim 1, further comprising generating the creep torque depending on an on/off of the brake signal.

3. The creep torque control method of claim 1, further comprising generating the creep torque when the brake signal is off and releasing the creep torque when the brake signal is on.

4. The creep torque control method of claim 1, further comprising:
   detecting a gear shift step; and
   detecting a vehicle speed,
   wherein the outputted creep torque is calculated based on the vehicle speed and the gear shift step along with the brake signal.

5. The creep torque control method of claim 1, further comprising performing a rate limit process or a filtering process so that the creep torque is gradually and continuously increased.

6. The creep torque control method of claim 1, further comprising generating, by a motor a driving torque or using regeneration torque to generate electricity, wherein the motor generates the creep torque.

7. The creep torque control method of claim 1, further comprising outputting by a transmission the creep torque when the brake signal is not detected after the brake signal has previously been detected.

8. The creep torque control method of claim 1, further comprising generating the creep torque only when a transmission of the vehicle is in a drive (D) state or a reverse (R) state.

9. The creep torque control method of claim 1, further comprising sensing a vehicle speed and generating the creep torque when the vehicle speed is 0.

10. A vehicle power delivery system comprising:
    a power source;
    a transmission configured to vary torque output from the power source; and
    a controller configured to detect a brake signal from a braking unit, and control a creep torque output by the transmission and power source based on the brake signal, wherein the creep torque is outputted for a predetermined time from a point in time when a brake on signal was generated,
    wherein the controller is further configured to delay the point in time of the brake on signal, wherein the creep torque is outputted while the point in time of the brake on signal is delayed.

11. The vehicle power delivery system of claim 10, wherein the creep torque is generated depending on an on/off of the brake signal.

12. The vehicle power delivery system of claim 10, wherein the creep torque is generated when the brake signal is off and released the creep torque when the brake signal is on.

13. The vehicle power delivery system of claim 10, further comprising:
    a sensor configured to detect a gear shift step; and
    the controller further configured to detect a vehicle speed,
    wherein the outputted creep torque is calculated based on the vehicle speed and the gear shift step along with the brake signal.

14. The vehicle power delivery system of claim 10, wherein a rate limit process or a filtering process is performed so that the creep torque is gradually and continuously increased.

15. The vehicle power delivery system of claim 10, wherein a motor is configured to generate the creep torque or use regeneration torque to generate electricity.

16. The vehicle power delivery system of claim 10, wherein the transmission outputs the creep torque when the brake signal is not detected after the brake signal has previously been detected.

17. The vehicle power delivery system of claim 10, wherein the creep torque is generated only when the vehicle transmission is in a drive (D) state or a reverse (R) state.

18. The vehicle power delivery system of claim 10, wherein the creep torque is generated when the vehicle speed is 0.

* * * * *